Figure 3:
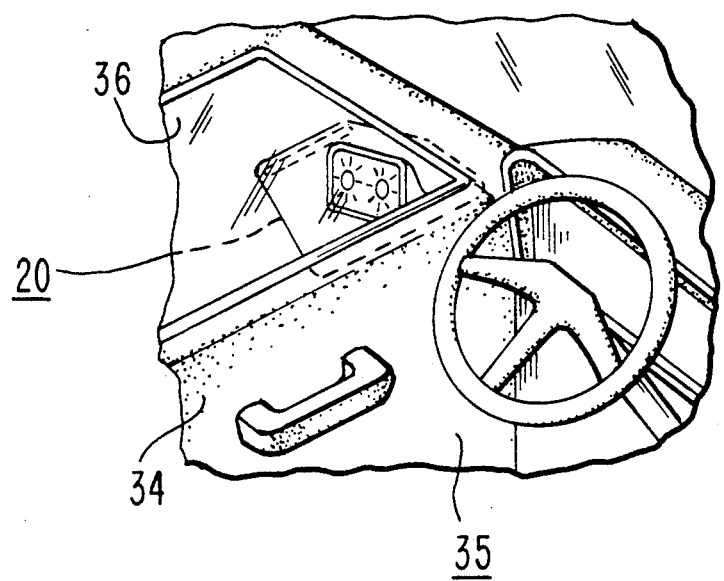

United States Patent [19]

Thompson, II

[11] Patent Number: 5,022,701
[45] Date of Patent: Jun. 11, 1991

[54] GLAREBLOCKER

[76] Inventor: Jesse P. Thompson, II, 63 Executive La., Willingboro, N.J. 08046

[21] Appl. No.: 507,529

[22] Filed: Apr. 11, 1990

[51] Int. Cl.$^5$ ............................................... B60J 3/00
[52] U.S. Cl. .................... 296/152; 296/97.9; 296/97.1; 160/105
[58] Field of Search ............ 296/152, 97.1, 97.2, 296/97.5, 97.7, 97.9; 160/DIG. 2, DIG. 3, 105, 370.2; 350/276 R, 277, 283

[56] References Cited

U.S. PATENT DOCUMENTS

| | | | |
|---|---|---|---|
| 1,600,809 | 9/1926 | Durdin, Jr. | 296/152 X |
| 1,736,688 | 11/1929 | Yerby et al. | 160/DIG. 2 X |
| 2,625,217 | 1/1953 | Spiller et al. | 160/370.2 X |
| 4,261,649 | 4/1981 | Richard | 296/97.7 X |
| 4,560,251 | 12/1985 | Murjahn | 350/283 |

FOREIGN PATENT DOCUMENTS

| | | | |
|---|---|---|---|
| 2942467 | 4/1981 | Fed. Rep. of Germany | 296/152 |
| 1129014 | 10/1968 | United Kingdom | 296/97.7 |

Primary Examiner—Dennis H. Pedder
Attorney, Agent, or Firm—W. L. Muckelroy

[57] ABSTRACT

A light-blocking and wind deflector device, similar to a pair of sunshades, which is adapted for use in vehicles having transparent side members, such as side glass windows or windshields. The device includes a shield in the form of a relatively stiff and generally flat sheet having sufficient opacity to serve as a light filtering medium for rear view mirrors attached to each side of the vehicle and to serve as a wind deflector. A preferred material for the sheet is a sheet of polarized plastic having a thickness of approximately ⅛ of an inch and a minimum area of about 64 square inches. A pair of shields are affixed to the side windows of a vehicle by a rectangular flange portion forming a part of each shield which portion is adapted to be inserted into the aperture into which a side window retracts, the aperture being in between the side window and the inner edge of the door. Each shield is positioned at a side window such that it blocks wind as well as a portion of any light reflected from an external rear view mirror.

2 Claims, 2 Drawing Sheets

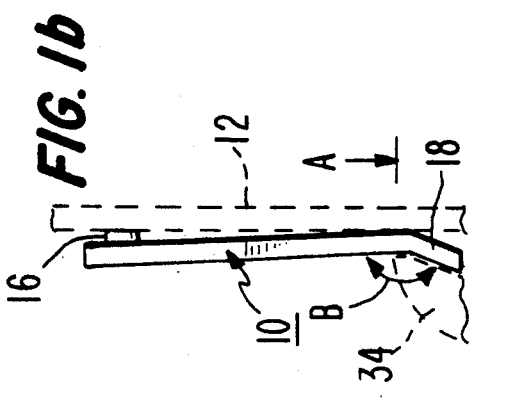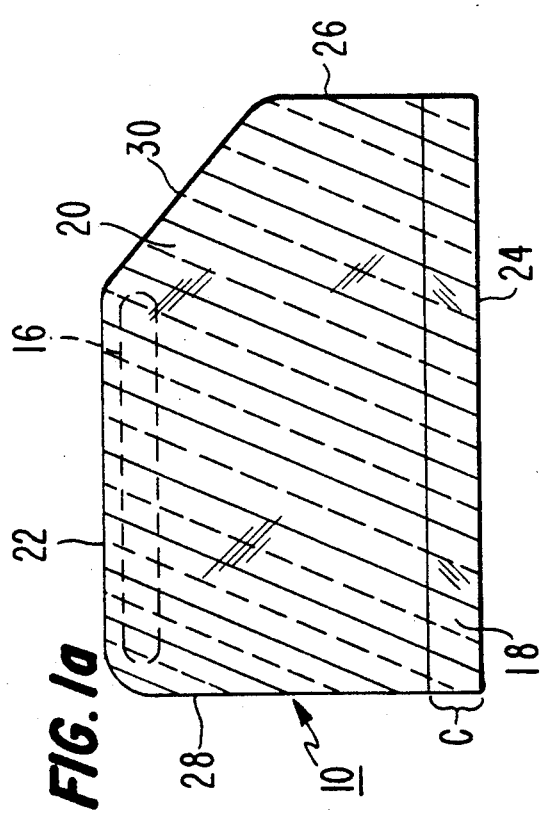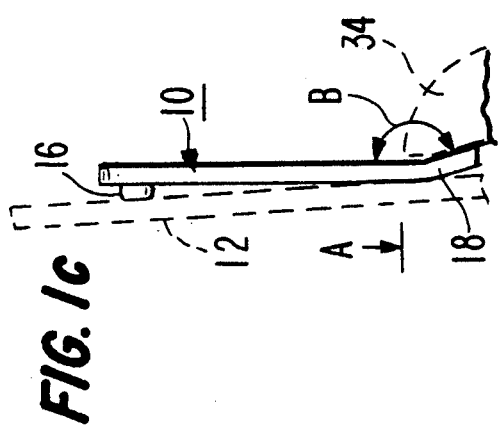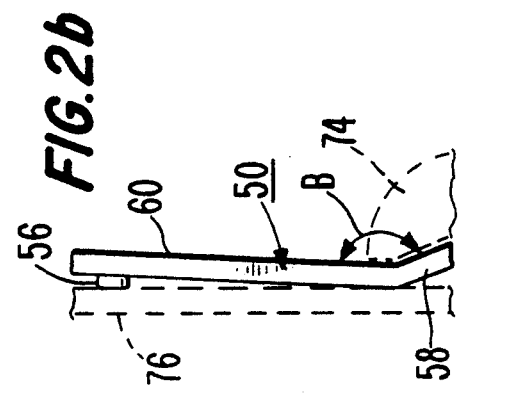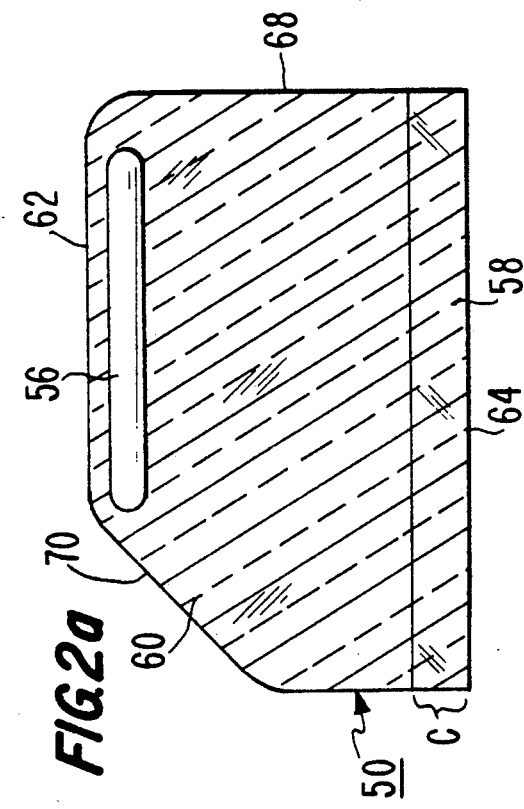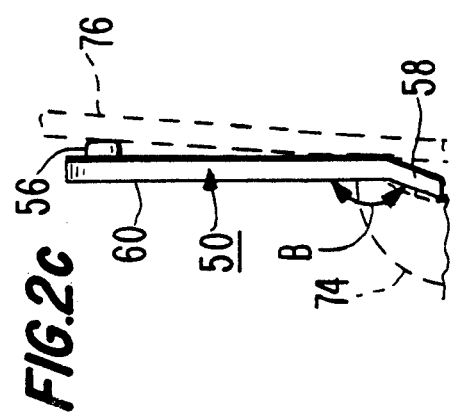

GLAREBLOCKER

BACKGROUND

1. Field of the Invention

This invention relates generally to safety devices for use on motor vehicles, and more specifically relates to a combination filter and wind shield for use in blocking at least some of the light rays which could interfere with the normal vision of the driver or other occupant of a motor vehicle and for blocking wind during movement when a side window is down. An accurate name for such a safety device is a glareblocker.

2. Background of the Invention

It has been recognized that operators of vehicles, especially drivers of trucks and automobiles, are greatly hampered in their task of guiding their vehicle when a blinding light is positioned such that its rays can enter a person's eyes. For this reason, it is common for vehicles to be provided with opaque shields, commonly called sun shields or sun visors which are mounted inside of a vehicle in a position adjacent to the vehicle's front windshield. However, a person who drives westwardly in the late afternoon towards the setting sun would typically move a sun visor so that it blocks off the sun's direct rays, thereby permitting the driver to see at least some of the road and traffic ahead of him—except for that region which is completely blocked off by the sun visor.

The mere size of the traditional sun visor is not the only factor which is significant, the placement of the sun visor also is quite important. It has been common to mount conventional sun visors on a horizontal rod having a pivotal mounting bracket at the corners of a windshield, so that a sun visor can be used either directly in front of the driver or to his left side. Sun blocking to the right of the driver is provided by use of the passenger side vehicle sun visor. Such a pivotal sun visor has not been without its limitations though, especially when the direction from which the sun's rays are coming is below or beyond the "reach" of a permanently mounted sun visor.

These deficiencies and others have been overcome to some extent by U.S. Pat. No. 2,613,104 to Parsons which provides an independently movable "light reflector" which can be held at essentially any desired position adjacent a metal window frame. A permanent magnet is secured to an edge of a planar sheet and the magnet serves as the attaching means for mounting the sheet at any other variety of positions adjacent a window.

A suction cup alternative to the Parsons magnetically-held sun visor is a sun visor adapted to be held to a glass pane by a suction cup as shown in U.S. Pat. No. 2,715,043 to Schwell.

A later improvement utilizing magnets on both sides of a window was suggested by Chary in U.S. Pat. No. 4,351,557 issued on Sept. 28, 1982.

A common drawback of each of the above-referenced constructions is their lack of effectiveness for blocking wind and in holding the sun visors disclosed stationary for an extended time. A sunshield which moves or falls off the windshield at an important time increases the probability of an accident. Thus, the driver is distracted by his need to reposition or suddenly recover a fallen sun visor and remount it on the windshield. This distraction from the road and surrounding traffic can even contribute to a mishap. Accordingly, it is an object of this invention to provide an article of manufacture in the nature of a glareblocker which overcomes many of the above described problems associated with the prior art.

Another object is to provide a relatively small sun glareblocker which is particularly easy to mount exactly where it is needed in order that the overall size of the device is not unduly great. So another object is to provide a device which requires essentially no installation effort and which can be easily transferred from one car to another.

Another object is to provide a construction which is useful at nighttime to block out any light rays emanating from a vehicle approaching from the rear—and more specifically, light rays that would otherwise be visible in an external rear view mirror.

Yet another object of the invention is to provide a device which will maintain its position in spite of vibrations emanating from the vehicle in which it is used and act as a window screen to shield wind, entering at the forwardmost corner of an open side window, from a driver's face.

Yet another object of the invention is to provide a glareblocker of a configuration which by virtue of its structure in combination with the general manner in which the wells of side windows are constructed operates to maintain itself in a position at the side window of a motor vehicle and deflect wind during motion of the vehicle from the driver's face when an adjacent side window is down; thus serving as a portable side vent window pane and shield.

Yet another object of this invention is to provide a cantilevered mount at or near a lowermost edge of said novel device such that an adjacent full sized side window can be substantially retracted and yet provide wind deflection, a stable mounting, and glare blocking. Referring to FIG. 1a shown is a preferred dimensional configuration for an extension at a lowermost extremity of a blocking device 10, namely a member 18 of a height C where C is approximately 1 inch.

Referring now to FIG. 1b and FIG. 1c a preferred angle B exists between the member 18 and the body of the blocking device 10, where B is equivalent to approximately 160 degrees. Referring to FIG. 1a, the blocking device 10 further comprises a resilient member 16 and a portion connected to the cantilevered member 18, for example, a shield 20. A preferred size for the shield 20 is about 64 square inches. This size provides sufficient light blocking material as well as a sufficient area for shielding against wind.

The blocking device 10 comprises a top edge 22 parallel to a bottom edge 24. The blocking device 10 further comprises a front edge 26 and a back edge 28. The edge 28 is parallel to the edge 26. The edge 26 is connected to the top edge 22 via a slanted transverse edge 30. The top edge 22 is connected to the rear edge 28. The rear edge 28 is innerconnected to the parallel front edge 26 via the bottom edge 24.

The bottom edge 24 is approximately 12 inches in length, for example. The back edge 28 is approximately 8 inches, for example. The top edge 22 is approximately 8 inches, for example. The edge 30 is approximately 5 inches, for example. The edge 26 is approximately 4 inches, for example.

The member 16 made of a shock absorbing material for example, a clear soft polymer, is disposed adjacent the shield 20, for example, near and below the top edge 22. The member 18 is wedged against an inside panel 34 of a left door 35 (shown in FIG. 3). The member 16 presses against a side window 36. The member 16 may be positioned near the member 18 to allow the window 36 to be partially retracted a substantial distance downward without releasing the member 16.

The blocking device 50 shown in FIG. 2a is a mirror image of the blocking device 10 shown in FIG. 1a. The dimensions and construction are similar to that described above for the left glareblocker shown in FIG. 1a.

Referring to FIG. 2a shown is a preferred dimensional configuration for an extension at a lowermost extremity of the blocking device 5 namely a member 58 of a height C where C is approximately 1 inch.

Referring now to FIG. 2b and FIG. 2c a preferred angle B between the member 58 and the body of the blocking device 50 is where B is equivalent to approximately 160 degrees. Referring to FIG. 2a, the blocking device 50 further comprises a resilient member 56 and a portion connected to the cantilevered member 58 for example a shield 60. A preferred size for the shield 60 is about 64 square inches. This size provides sufficient light blocking material as well as a sufficient area for shielding against wind.

The blocking device 50 comprises a top edge 62 parallel to a bottom edge 64. The blocking device 50 further comprises a front edge 66 and a back edge 68. The edge 68 is parallel to the edge 66. The edge 66 is connected to the top edge 62 via a slanted transverse edge 70. The top edge 62 is connected to the rear edge 68. The rear edge 68 is inner connected to the opposite front edge 66 via the bottom edge 64.

The bottom edge 64 is approximately 12 inches in length, for example. The back edge 68 is approximately 8 inches, for example. The top edge 62 is approximately 8 inches, for example. The edge 70 is approximately 5 inches, for example. The edge 66 is approximately 4 inches, for example.

The member 56 made of shock absorbing material is disposed adjacent the shield 70 near and below the top edge 62. The member 58 is wedged against on inside right panel 74 of a right door 75 (shown in FIG. 4). The member 56 presses against a side window 76.

A preferred material from which the blocking device 10 and the blocking device 50 are fabricated is a relatively stiff plastic sheet having a thickness of at least 0.125 inches. A suitable material is Kodacel plastic sheet 7M4 produced by Eastman Plastic Products, Inc. Another satisfactory material is a polyester film marketed by the Transilwrap Company of Missouri, Incorporated which has an ultraviolet resistance rating of at least 10 years. A seven layer laminate is also available from American Polarizers, Inc.

In use, it is assumed that the driver of the vehicle is confronted with light rays from the sun or at night from the reflection of the lights of motor vehicles and the like. And, it is further assumed that the driver anticipates that the sun will be a relatively small distance above the horizon with the blocking device 10 positioned in the well of the left side door window and with the blocking device 50 positioned in the window of the right side door well as shown in FIGS. 3 and 4, respectively.

Figure 4:
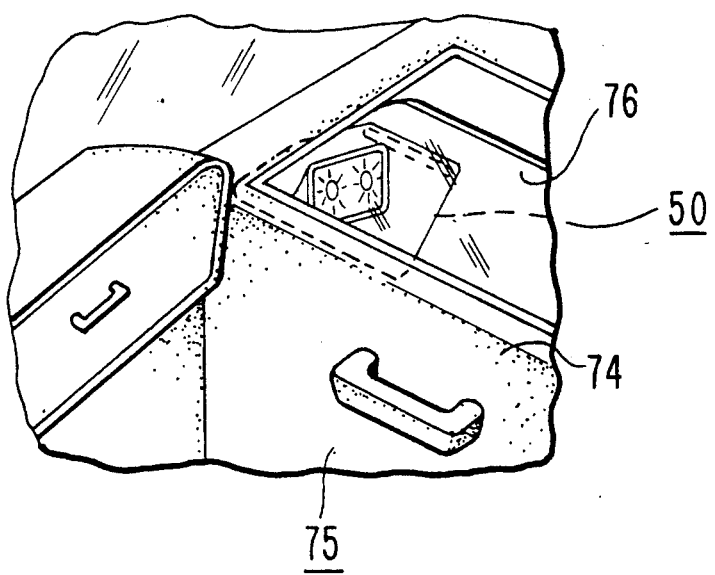

In addition to utility of the blocking devices 10 and 50 as shown in FIGS. 3 and 4 during daylight hours each is also of substantial value at night for shielding against blinding headlights reflected through the side mirrors and for shielding against wind. One of the most offensive things that can happen to a driver of a vehicle is to have the car approached from the rear with high beam highlights shining brightly into the eyes of the leading driver through reflections in rearview mirrors. A driver eliminates offensive reflections in an external mirror by insuring that the blocking device 10 is in between the line of vision between the driver's eyes and the left most mirror as shown in FIG. 3 and insuring that the blocking device 50 as shown in FIG. 4 is in between the line of vision of the driver and an external right side rear view mirror. By use of this novel invention the vehicle's driver does not have to change the orientation of his external rearview mirrors to avoid brightly shining high beams therein being reflected into his eyes and the effectiveness of the rearview mirrors is not compromised by the wind or by the side window being retracted.

While only a preferred embodiment of the invention has been described in great detail herein, it should be apparent to those skilled in the art that numerous variations on the basic idea are possible without departing from the spirit of the invention. Accordingly, the invention herein is deemed to be limited only by the scope of the appended claims, to wit:

What is claimed is:

1. A blocking device adapted for use in a vehicle having a side door, an inner panel, a side window and a cavity for receiving same and a nearby side-mounted rearview mirror, comprising:
   (a) a shield in the form of a relatively stiff sheet of a darkened transparent material having sufficient capacity to block at least a portion of any incoming wind and to block at least a portion of any incoming light reflected from said rearview mirror;
   (b) A first means for simultaneously cushioning said sheet from vibrations from said vehicle and bracing said sheet against said side window said first means extending in a first direction away from said sheet and towards said side window;
   (c) A second means for inserting said sheet in said cavity in between said inner panel of said side door and the side window, said second means further adapted to press said sheet against the side window wherein said sheet has at least five edges configured to generally adapt to a foremost corner of a side window, first and second of said edges being horizontally parallel and of unequal lengths, said first edge being shorter than said second edge, and a third edge being oriented obliquely to said first edge and a fourth edge, said fourth edge being perpendicular to said second edge and parallel to a fifth edge which interconnects said first edge and said second edge wherein said first means is an elongated resilient member attached to said sheet parallel to said first edge wherein said second means is a cantilevered panel located at said second edge, said cantilevered panel extending away from said sheet in a second direction opposite to said first direction in which said first means extends.

2. A blocking device adapted for use in a vehicle having a side door, an inner panel, a side window and a cavity for receiving same and a nearby side-mounted rearview mirror, comprising a blocking means for shielding a portion of light reflected from said rearview mirror and simultaneously blocking a portion of any wind flowing into said vehicle when said vehicle is in motion; a first means for simultaneously cushioning said blocking means from vibrations from said vehicle and bracing said sheet against said side window, said first means extending in a first direction away from said blocking means and towards said side window; a second means for inserting said sheet in said cavity in between the inner panel of said side door and the side window, said second means further adapted to press said blocking means against the side window wherein the blocking means has at least five edges configured to generally adapt to a foremost corner of a side window, first and second of said edges being horizontally parallel and of unequal lengths, said first edge being shorter than said second edge, a third edge being oriented obliquely to said first edge and a fourth edge, said fourth edge being perpendicular to said second edge and parallel to a fifth edge which interconnects said first and said second edges wherein said first means is an elongated resilient member attached to said sheet parallel to said first edge and above said second means wherein said second means comprises a cantilevered panel located at said second edge, said cantilevered panel extending away from said sheet in a second direction opposite to said first direction in which said first means extends.

* * * * *